April 18, 1933.   C. W. CLARK   1,904,410

PISTON RING

Filed Nov. 11, 1932

Inventor
Carl W. Clark.
C. W. Anderson Son
By
Attorney

Patented Apr. 18, 1933

1,904,410

UNITED STATES PATENT OFFICE

CARL W. CLARK, OF BETHESDA, OHIO, ASSIGNOR OF ONE-FOURTH TO CECIL L. AYERS, OF ST. CLAIRSVILLE, OHIO, AND ONE-FOURTH TO S. T. VAUGHN, OF BETHESDA, OHIO

PISTON RING

Application filed November 11, 1932. Serial No. 642,293.

The invention has relation to piston rings, and particularly to piston rings operating on the exhaust stroke of the piston to remove excess oil from the cylinder wall; an object of the invention being to provide an improved ring of this description of simple nature, capable of economical manufacture, and adapted to prevent the oil accumulated by the scraping edge of the ring from working back of the ring where it tends to became carbonized and interfere with the proper working of the ring.

The invention consists in the novel construction and combination of parts as set forth in the appended claims.

In the accompanying drawing illustrating the invention:

Figure 1:
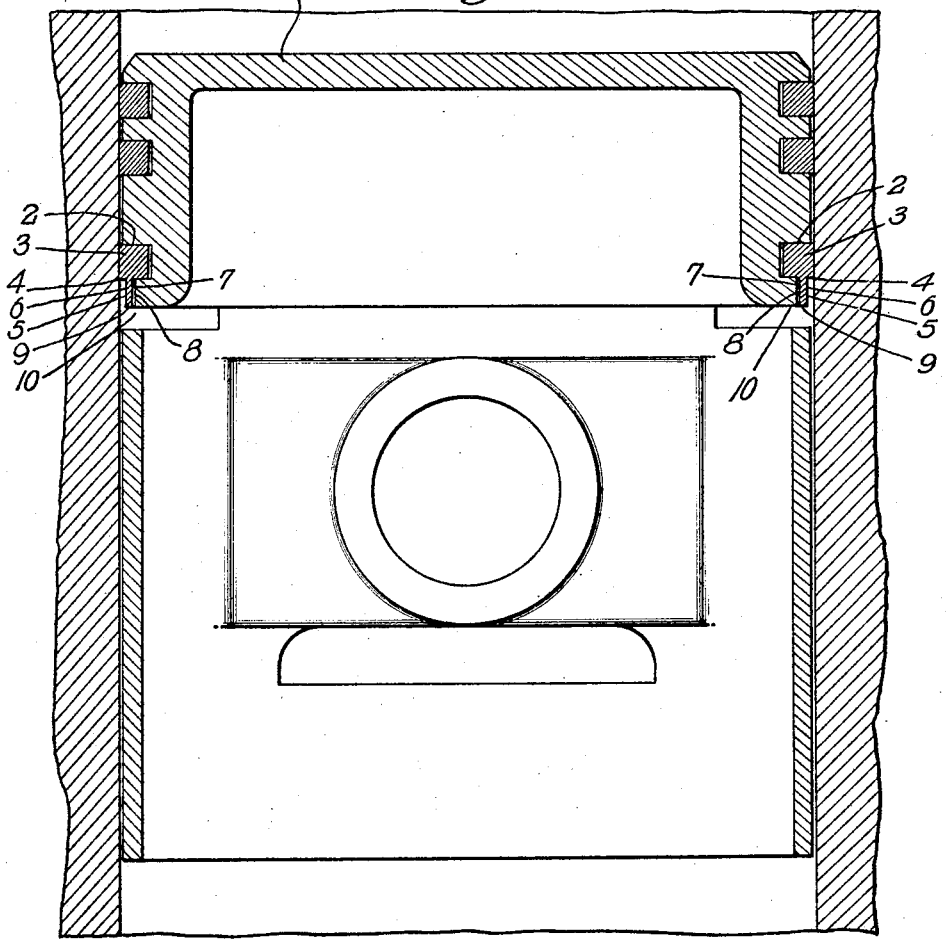
Figure 1 is a central longitudinal section of the ring, as applied, on an enlarged scale.
Figure 2:
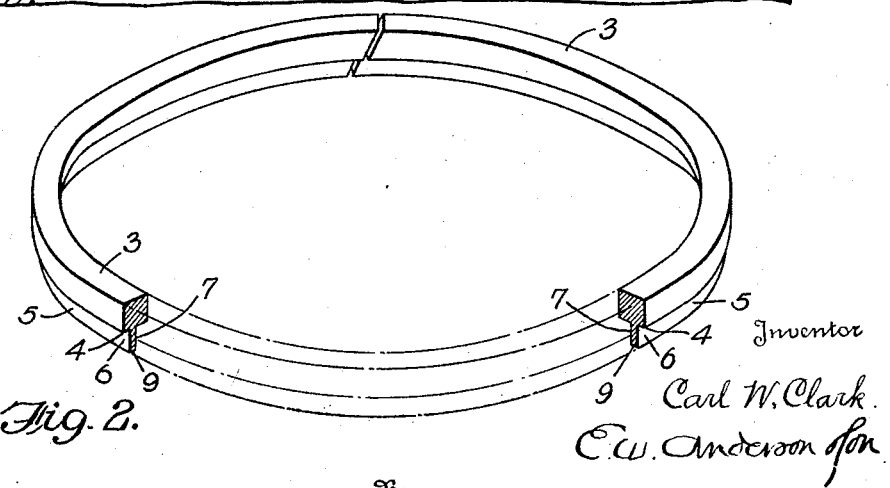
Figure 2 is a perspective view of the ring, partly broken away.

In the drawing, the numeral 1 designates a piston having the usual groove 2 for the ring, which ring in the present case comprises a hollow cylindrical body 3 of rectangular form in cross section, having an annular right angle oil scraping edge 4, and a thin hollow cylindrical axially extending flange 5, also of rectangular form in cross section, of equal thickness throughout, and located intermediately of the inner and outer cylindrical surfaces of said body and adjacent the outer cylindrical surface thereof, the inner and outer cylindrical walls 6 and 7 of said flange being located in cylindrical planes parallel with each other and with the inner and outer cylindrical walls of said body, and transversely spaced from the latter walls.

The piston is slightly reduced in diameter to provide a ring land 8, located intermediately of the piston groove 2 and an oil drain slot 10 of the piston.

The oil accumulated by the scraping edge 4 of the ring is caught by the outer face 7 of the flange 5, the latter extending downwardly over said ring land 8 to said oil drain slot of the piston.

There being no acute angles in the ring or its flange extension, manufacture is facilitated and there are no sharp edges to become marred or broken or to cut the hands in installation or removal of the ring. The squared lower edge 9 of the flange extension is shown as overlying the oil release groove 10 of the piston.

I claim:

1. The combination with a piston having a ring groove and an oil drain slot and a ring land of reduced diameter located intermediately of said groove and said slot, of a piston ring located in said groove and having an axially extending flange located intermediately of the inner and outer faces of said ring and extending downwardly over said ring land to said oil drain slot, whereby oil is prevented from passing behind said ring.

2. The combination with a piston having a ring groove and an oil drain slot and a ring land of reduced diameter located intermediately of said groove and said slot, of a piston ring located in said groove and having an axially extending flange located intermediately of the inner and outer faces of and adjacent the outer face of said ring and extending downwardly over said ring land to said oil drain slot, whereby oil is prevented from passing behind the ring, said ring being transversely split, of rectangular form in cross section and having a right angle oil scraping edge, and said flange being also of rectangular form in cross section.

In testimony whereof I affix my signature.

CARL W. CLARK.